US012619510B2

(12) United States Patent
Winterberg et al.

(10) Patent No.: US 12,619,510 B2
(45) Date of Patent: May 5, 2026

(54) DOUBLE DATA RATE CHANNEL SENSITIVITY AND DUAL IN-LINE MEMORY MODULE POPULATION OPTIMIZATION

(71) Applicant: DELL PRODUCTS L.P., Round Rock, TX (US)

(72) Inventors: Douglas Winterberg, York, SC (US); Bhyrav Mutnury, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 55 days.

(21) Appl. No.: 18/747,836

(22) Filed: Jun. 19, 2024

(65) Prior Publication Data

US 2025/0390405 A1    Dec. 25, 2025

(51) Int. Cl.
*G06F 11/30* (2006.01)
*G06F 11/34* (2006.01)

(52) U.S. Cl.
CPC ...... *G06F 11/3041* (2013.01); *G06F 11/3452* (2013.01)

(58) Field of Classification Search
CPC .......................... G06F 11/3041; G06F 11/3452
See application file for complete search history.

(56) References Cited

U.S. PATENT DOCUMENTS

| | | | |
|---|---|---|---|
| 9,443,115 B2 | 9/2016 | Berke et al. | |
| 9,536,550 B1 * | 1/2017 | Ma ......................... | G11B 5/455 |
| 2002/0147892 A1 * | 10/2002 | Rentschler .......... | G06F 13/1689 711/100 |
| 2011/0231697 A1 * | 9/2011 | Berke ................... | G06F 11/004 714/48 |
| 2019/0044799 A1 * | 2/2019 | Browne ............... | H04L 41/082 |
| 2019/0121685 A1 * | 4/2019 | Coutinho .......... | G06F 16/24578 |
| 2019/0171507 A1 * | 6/2019 | Karpagavinayagam .................... G06F 11/0769 |
| 2019/0189236 A1 * | 6/2019 | Poliakov .......... | G11C 29/56008 |
| 2025/0028469 A1 * | 1/2025 | Kulshrestha ........ | G06F 11/3034 |
| 2025/0234306 A1 * | 7/2025 | Yuk ..................... | H04B 17/328 |

* cited by examiner

*Primary Examiner* — Farley Abad

(74) *Attorney, Agent, or Firm* — Larson Newman, LLP

(57) ABSTRACT

An information handling system comprising a first input/output (I/O) device and a Basic Input/Output System (BIOS) configured to perform a first I/O health check of the first I/O device and to gather a first I/O health check data from the first I/O health check performed. The information handling system also includes a processor configured to calculate a first set of deltas between a first set of channel margins associated with the first I/O device based on the first I/O health check data and expected channel margins and determine whether the first set of deltas is within the expected channel margins for the first I/O device. When the first set of deltas is within the expected channel margins, then identify the first I/O device as healthy. When the first set of deltas is not within the expected channel margins, then identify the first I/O device as unhealthy.

20 Claims, 3 Drawing Sheets

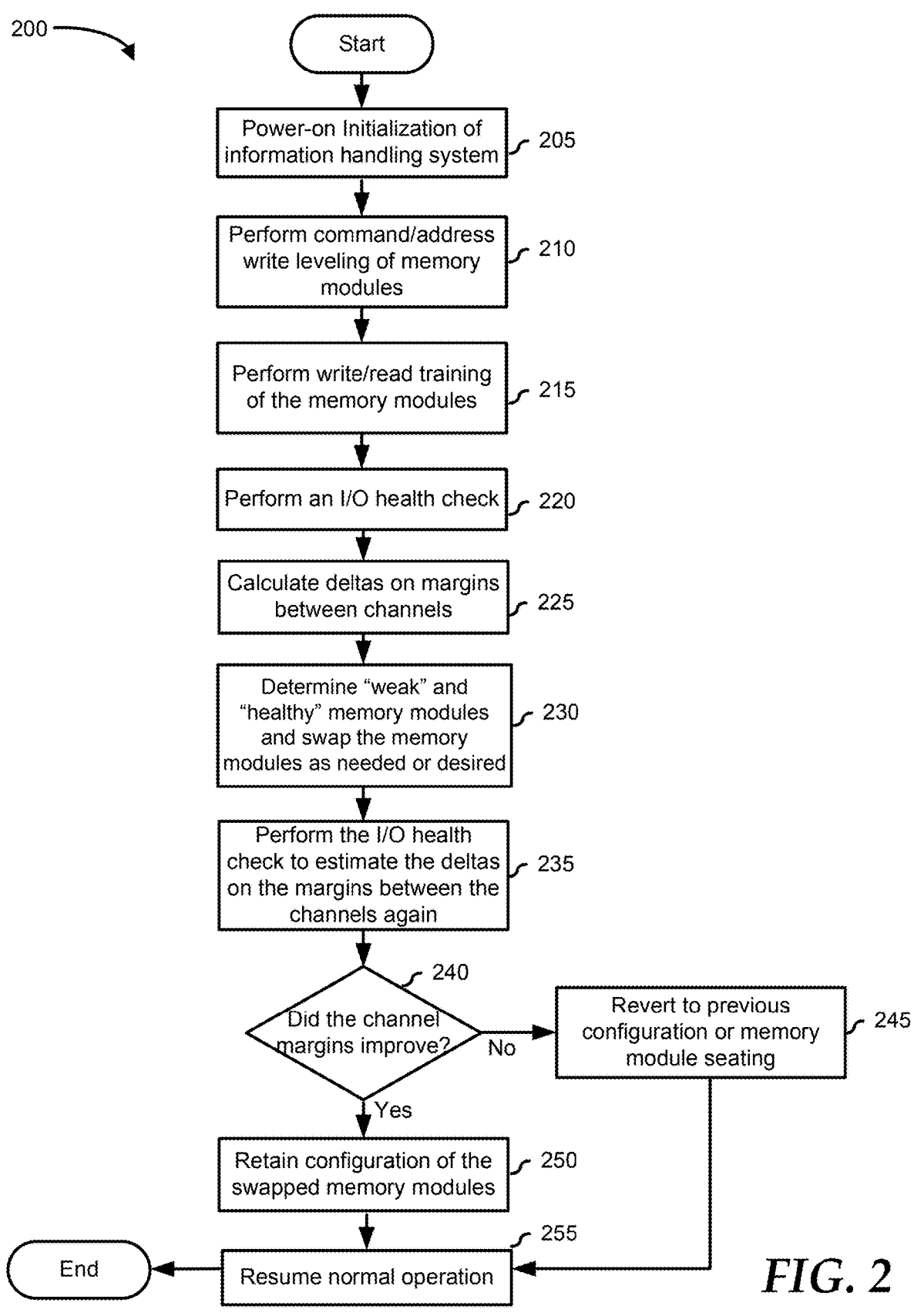

200

Start

Power-on Initialization of information handling system ⌐ 205

Perform command/address write leveling of memory modules ⌐ 210

Perform write/read training of the memory modules ⌐ 215

Perform an I/O health check ⌐ 220

Calculate deltas on margins between channels ⌐ 225

Determine "weak" and "healthy" memory modules and swap the memory modules as needed or desired ⌐ 230

Perform the I/O health check to estimate the deltas on the margins between the channels again ⌐ 235

240
Did the channel margins improve?     No →     Revert to previous configuration or memory module seating ⌐ 245

Yes

Retain configuration of the swapped memory modules ⌐ 250

⌐ 255

End ←     Resume normal operation

Information Handling System

302 Processor

304 Processor

334 Video Display

320 Memory

310

306

322

308

332

330

336

Chipset

Graphics Interface

312

340 NVRAM

342 BIOS/ EFI

370 I/O Interface

350 Disk Controller

392

356 ODD

352

376 TPM

380 Network Interface

374 Add-On Resource

372

354 HDD

390 BMC

382

360 Disk Emulator

394

364

362

Solid State Drive

DOUBLE DATA RATE CHANNEL SENSITIVITY AND DUAL IN-LINE MEMORY MODULE POPULATION OPTIMIZATION

FIELD OF THE DISCLOSURE

The present disclosure generally relates to information handling systems, and more particularly relates to Double Data Rate (DDR) channel sensitivity and Dual In-line Memory Module (DIMM) population optimization.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system comprising a first input/output (I/O) device and a Basic Input/Output System (BIOS) configured to perform a first I/O health check of the first I/O device and to gather a first I/O health check data from the first I/O health check performed. The information handling system also includes a processor configured to calculate a first set of deltas between a first set of channel margins associated with the first I/O device based on the first I/O health check data and expected channel margins and determine whether the first set of deltas is within the expected channel margins for the first I/O device. When the first set of deltas is within the expected channel margins, then identify the first I/O device as healthy. When the first set of deltas is not within the expected channel margins, then identify the first I/O device as unhealthy.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 2 is a flowchart of a method for Double Data Rate (DDR) channel sensitivity and Dual In-line Memory Module (DIMM) population optimization, according to an embodiment of the present disclosure.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

In general, information handling systems include a processing device, a memory device for storing computer code that when executed by the processor, causes the information handling system to perform various operations on data, and a data storing device for storing the data. Memory modules are often configured on a circuit card, often referred to as a DIMM. The information handling system includes various other pluggable circuit cards, such as Peripheral Component Interconnect (PCI) cards, DIMMs, etc. Certain information handling system devices, such as processing devices and pluggable circuit cards, generally plug into a connector slot or socket. The connector slot typically includes several metal connectors for contacting corresponding connector pads on the devices.

With DDR speeds exceeding third-generation Peripheral Component Interconnect-Express (PCIe Gen3) speeds of 8-12+ gigabits per second (Gbps), interface margins, also referred to herein as channel margins, are becoming increasingly sensitive to channel variations and DIMM distributions. In addition, processor and manufacturing variations are beginning to play a role at these speeds. Further, no two DIMMs from the same vendor behave the same. Similarly, no two printed circuit boards (PCBs) from the same manufacturer behave the same. Accordingly, a marginal DIMM that is populated at a DDR channel, also referred to herein simply as a channel, farther than a processor or a central processing unit (CPU) can have worse interface margins than if the DIMM is populated at the nearest channel. However, there is currently no mechanism to determine the optimal channel placement of a DIMM. Accordingly, the present disclosure provides a system and method to determine DDR channel sensitivity and DIMM population optimization.

Figure 1:
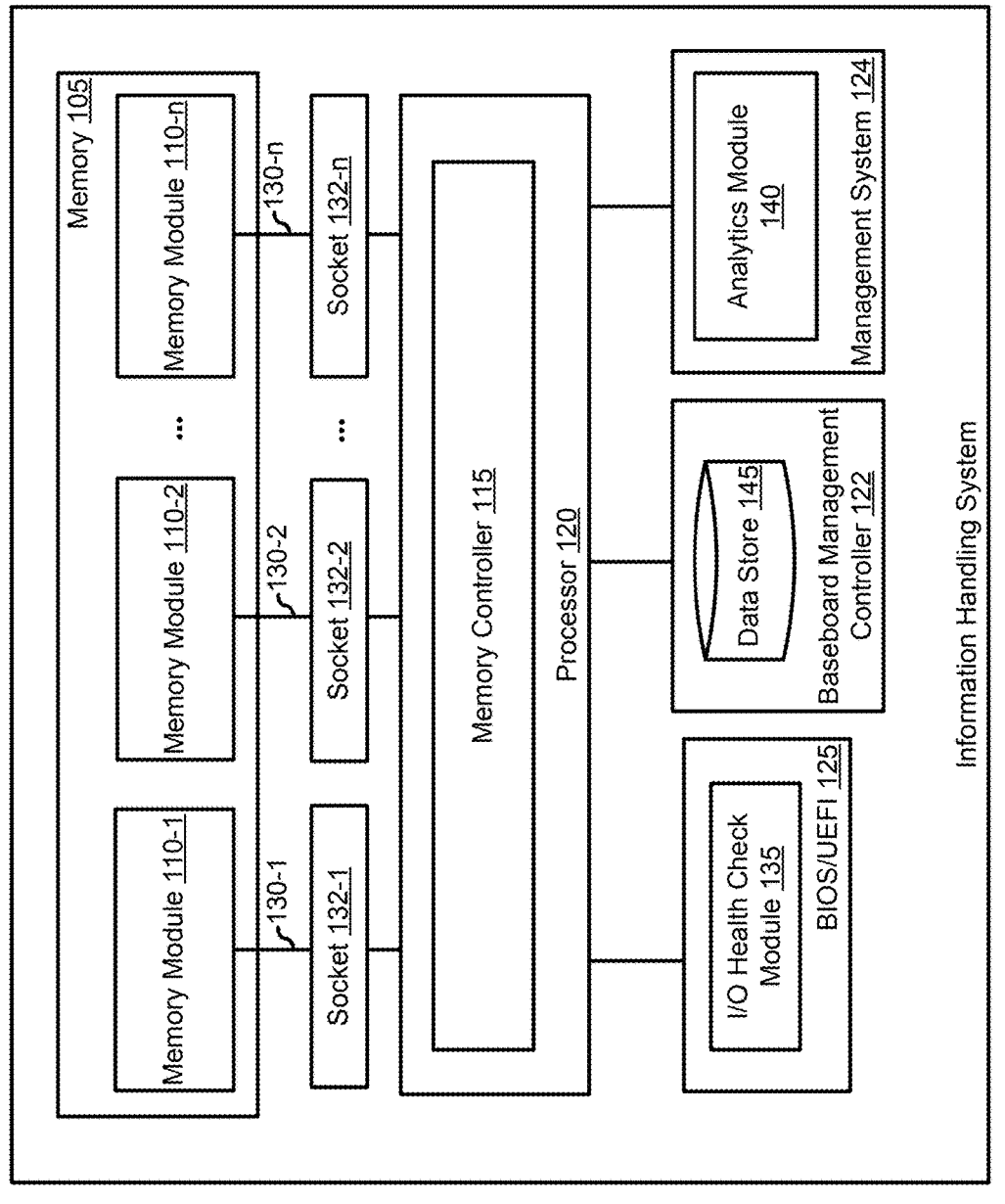
FIG. 1 is a block diagram of an information handling system, according to an embodiment of the present disclosure.

FIG. 1 shows a portion of an information handling system 100 configured for DDR channel sensitivity and DIMM population optimization, according to an embodiment of the present disclosure. Information handling system 100, which is similar to information handling system 300 of FIG. 3, includes a memory 105, a processor 120, a basic input and output system/Unified Extensible Firmware Interface (BIOS/UEFI) 125, a baseboard management controller (BMC) 122, a management system 124, and sockets 132-1 through socket 132-*n*. BIOS/UEFI 125 includes an I/O health check module 135. BMC 122 includes a data store 145. Management system 124 includes an analytics module 140. Memory 105 includes memory modules 110-1 through 110-*n* which may be seated into sockets 132-1 through 132-*n*. Processor 120 includes a memory controller 115. Memory controller 115 may be coupled with memory modules 110 via memory channels 130-1 through 130-*n*. Memory controller 115, memory 105 with memory modules 110, and memory channels 130 may be referred to as a memory subsystem. Processor 120 is communicatively coupled to BIOS/UEFI 125 and BMC 122. However, any variety of connections between memory modules 110, processor 120, BMC 122, management system 124, and BIOS/UEFI 125 are envisioned as falling within the scope of the present disclosure.

Figure 3:
FIG. 3 is a block diagram of a generalized information handling system, according to an embodiment of the present disclosure.

Memory 105, which is similar to memory 320 of FIG. 3, may comprise any system, device, or apparatus operable to retain program instructions or data for a period of time and may represent a main memory of information handling system 100. Memory 105 includes memory modules 110 may be of similar memory types and comprise of fifth generation double data rate (DDR5) or sixth-generation DDR (DDR6) DIMMs. Alternatively, memory modules 110 may be comprised of Small Outline DIMMs (SODIMM), MicroDIMMs, Compression Attached Memory Modules (CAMM), or any other type of memory module. Sockets 132, also referred to as memory sockets or memory slots, maybe PCIe or serial Advanced Technology Attachment (SATA) DDR5 DIMM sockets, DDR6 DIMM sockets, or any other type of sockets configured for memory modules 110. Memory modules 110 may be coupled to sockets 132. For example, memory module 110-1 may be coupled to socket 132-1 while memory module 110-2 may be coupled to socket 132-2. In particular, sockets 132 may include electrical contracts that are configured to mate with pins of memory modules 110.

Memory modules 110 and sockets 132 may be configured to utilize various features of Joint Electron Devices Engineering Council (JEDEC) standard or future standards for various memory types and sockets, respectively. Each memory module may be communicatively coupled to memory controller 115 via memory channels 130. Memory channels 130 may be configured to support one, two, three, or more sockets per channel. Further, although three channels are shown, fewer channels or additional channels may be communicatively coupled to memory controller 115. Each one of memory channels 130 may include a command/address/control bus (CMD/ADR), a clock for timing of signals on a CMD/ADR line, a data (DQ) bus, and a data strobe (DQS) for the signals on the DQ bus. Accordingly, memory channels 130 may be configured to carry data and command signals between the memory controller 115 and memory 105. Sockets 132 may conform to the DDR DIMM standards, such as DDR5/DDR6 DIMM standards by the JEDEC. The sockets may also conform to a future JEDEC standard, another memory standard, or a proprietary design.

Processor 120, which is similar to processors 302 and 304 of FIG. 3, may comprise of any system, device, or apparatus operable to interpret and/or execute program instructions and/or process data, microcontroller, digital signal processor, application-specific integrated circuit, or any other digital signal processor, application specific integrated circuit, or any other digital or analog circuitry configured to interpret and/or execute program instructions and/or process data stored in memory 105 and/or another component of information handling system 100. In one example, processor 120 may be a CPU.

Memory controller 115 may be any system, device, or apparatus configured to manage data storage and retrieval operations from memory 105. In particular, memory controller 115 may represent a portion of information handling system 100 that operates to manage the flow of information to memory modules 110. For example, memory controller 115 may be configured to read data from and/or write data to memory modules 110. Memory controller 115 and memory modules 110 may operate in accordance with a memory architecture implemented on information handling system 100. For example, memory controller 115 and memory modules 110 may operate in accordance with a DDR standard such as a JEDEC DDR5 or DDR6 standard. It will be understood that, where memory controller 115 and memory modules 110 operate in accordance with a different DDR standard, then memory controller 115 and memory modules 110 may be configured to provide different numbers of separate memory channels as compared to FIG. 1 without varying from the scope of this disclosure. In addition, although memory controller 115 is shown as a component of processor 120, memory controller 115 may be separate from processor 120 and/or maybe an integral portion of another component of information handling system 100. For example, memory controller 115 may be integrated into memory 105.

BIOS/UEFI 125, which is similar to BIOS/EFI module 342 of FIG. 3, may include any system, device, or apparatus configured to identify, test, and/or initialize information handling resources of information handling system 100, and/or initialize interoperation of information handling system 100 with other information handling systems. "BIOS" may broadly refer to any system, device, or apparatus configured to perform such functionality, including without limitation, a UEFI. Accordingly, for purposes of this disclosure, extensible firmware interface (EFI) and unified EFI (UEFI) are used interchangeably and called UEFI for simplicity. Also, as used herein, legacy BIOS, as well as BIOS/UEFI, are referred to as BIOS for simplicity.

In some embodiments, BIOS/UEFI 125 may be implemented as a program of instructions that may be read by and executed on processor 120. In these and other embodiments, BIOS/UEFI 125 may comprise boot firmware configured to be the first code executed by processor 120 when information handling system 100 is booted and/or powered on. For example, BIOS/UEFI 125 may be configured to initialize memory 105 in a predefined manner according to JEDEC specification at power on of information handling system 100. In particular, BIOS/UEFI 125 may operate to execute a memory reference code that reads information related to the configuration and capabilities of memory modules 110 and sets up the operating properties of memory modules 110 and of memory controller 115 to ensure proper operation of memory controller 115 and memory modules 110. For example, BIOS/UEFI 125 may be configured to perform command/address write leveling to allow memory controller 115 to compensate for skew. Further, BIOS/UEFI 125 may be configured to perform write/read training which includes leveling data (DQ) and data strobe (DQS) signal classes. The write/read training may also include reference voltage (Vref) training to determine a range of Vref values where a memory interface is stable. In addition, the write/read training includes calibration of delay registers.

I/O health check module 135 may be configured to provide monitoring and health check operations for various I/O types within information handling system 100, such as a PCIe, SATA, DDR5, DDR6, etc. In particular, I/O health check module 135 may be configured to collect various operating parameters that are set up for different I/O interfaces by BIOS/UEFI 125 during a system boot phase to determine a health status of information handling system 100 and its components. For example, in the context of DDR interfaces, I/O health check module 135 may be configured to monitor the memory initialization process as performed by the memory reference code during the system boot phase. The parameters that are monitored may include command/ address bus write leveling, data bus read/write training, or other parameters, such as timing margins, read/write voltage margins, temperature margins, or the like. I/O health check data gathered during the monitoring and health check operation of information handling system 100 may be stored in data store 145. The I/O health check data may also be stored as an I/O health check log at BMC 122. Data store 145 is a storage system that supplies data storage services to components of information handling system 100 such as BMC 122 and management system 124, wherein the components may be attached directly to information handling system 100 or through a network.

In turn, BMC 122 may provide the I/O health check log or a report to management system 124 for analysis. In addition, BMC 122, and/or management system 124 may also provide the I/O health check log to a management system of the manufacturer of information handling system 100, wherein the management system may also receive the I/O health check logs or reports from BMCs of other information handling systems for further analysis. Management system 124 may be configured to provide access to a range of asset management functions and support systems to assist information technology professionals in providing and managing associated with managed assets, such as information handling system 100.

Management system 124 may be configured to collect the I/O health check log for analysis to detect trends in the I/O health status of multiple information handling systems to detect trends in manufacturing robustness, or the like. In particular, management system 124 may include an analytics module 140 that is configured to receive the I/O health status from information handling system 100 and/or other information handling systems and perform various statistical and regression analyses. Management system 124 may transmit the I/O health data to a similar management system of the manufacturer for similar analyses of a plurality of I/O health logs among a plurality of information handling systems.

It has been understood in the present disclosure that as the speed of DDR5 or DDR6 DIMMs can exceed the speed of PCIe Gen3 DDR interface, channel margins are becoming sensitive to channel variations and DIMM distribution. In addition, different DIMM or memory channels may behave differently even if the memory channels are from the same manufacturer and/or the same technical specification. Further, some memory sockets and/or memory channels have more margins than other memory sockets and/or memory channels because of their layout advantage. For example, channel margins of a memory socket also referred to simply as a socket or a slot, which is farther from the CPU may be worse than those nearer the CPU. For example, socket 132-1 may have better channel margins than socket 132-2 because of its location relative to processor 120. In this example, socket 132-1 may be physically nearer to processor 120 than socket 132-2. These variances can impact signal integrity of information handling systems. To reduce such impact on the signal integrity, a designer of an information handling system may profile memory module and socket pairings to determine an optimal channel population based on the expected channel margins via simulations during a new product introduction (NPI) validation.

For example, during an NPI phase of the information handling system, memory modules, sockets, and/or memory channels, a designer can characterize typical or expected channel margin ranges for each memory module, socket, and/or memory channel. For example, the designer may perform simulations in a laboratory setting. Once the channel margins are understood, I/O health check module 135 may be invoked to determine the optimal placement of memory modules 110. During the I/O health check, I/O health check module 135 may scan the channel margins to determine the optimal memory module population based on the expected channel margins.

Based on the scan, analytics module 140 may determine whether channel margins associated with a memory module outperform or underperform its expected channel margins. For example, analytics module 140 may determine whether deltas between the channel margins of memory modules 110 and the expected channel margins exceed or are greater than predefined upper limits, where the predefined upper limits are 'n' ticks. Here, ticks can refer to clock timing after the information handling system has been distributed to a user. During the manufacture and/or design phase, the ticks may refer to a receiver "phase rotator" steps for horizontal direction and "vref" steps for vertical direction. In this example, 'n' can be configured by an engineer based on platform DDR technology, DDR channel, and speed. If the deltas exceed or are greater than the predefined upper limits, then the memory module is considered to outperform the expected channel margins and can be identified as healthy. The memory module may also be considered healthy if the deltas are within the expected channel margins.

Analytics module 140 may also determine whether the deltas between the channel margins of memory modules 110 and the expected channel margins fall short of predefined lower limits, where the predefined lower limits are in 'm' ticks. Similar to the values of 'n', 'm' can be configured by a system engineer based on platform DDR technology, DDR channel, and speed. If the channel margins fall short or are less than the predefined lower limits, then the memory module is considered to underperform the expected channel margins and can be identified as weak or unhealthy. Accordingly, if the channel margins of the memory module are on par with the expected channel margins, then the memory module can be identified as standard. There may be an instance wherein one of the channel margins of a memory module can outperform one of the expected channel margins and at the same time, another channel margin can underperform one of the expected channel margins. In this case, the memory module can also be considered weak or unhealthy. The memory module may also be considered unhealthy if the deltas are not within the expected channel margins.

The memory modules may be ranked from the weakest to the healthiest. Similarly, analytics module 140 may also determine whether a socket is weak or healthy and rank the sockets from the weakest to the healthiest. The health of the memory modules and the sockets, such as channel sensitivity may be considered when determining population seating to optimize the channel margins. When the channel margins are understood, analytics module 140 may use data from the I/O health check to determine the optimal placement of the memory modules or DIMM population. Analytics module 140 may determine memory module placements, such as optimal memory module and socket pairings. A report that includes a recommendation regarding an optimal placement of the memory modules may be generated. The report may also provide information on the improvement of the channel margins when swapped according to the recommendation.

For example, a weak memory module can be swapped with a healthy memory module, such that the weakest memory module is not paired with the weakest socket. Some sockets have more margins than other sockets due to their layout advantages. Accordingly, a healthy memory module with higher channel margins can tolerate being seated in a weak socket and still have ample channel margins. Similarly, the healthy memory module can tolerate being paired with a socket that is farther from a processor. Accordingly, a weak memory module may be paired with a healthy socket, sometimes even if the socket is farther away from the processor. Thus, the swap may optimize the distribution of memory modules which may also improve channel margins. The swap may be a hot swap or a cold swap, wherein an engineer or user may swap two memory modules. The swap may be performed based on the recommendation provided by I/O analytics module 140. For example, wherein initially memory module 110-1 is seated in socket 132-1 and memory module 110-2 is seated in socket 132-2, memory module 110-1 may be swapped with memory module 110-2, wherein memory module 110-1 may be seated into socket 132-2 while memory module 110-3 may be seated into socket 132-1. The swap may be performed at a factory during the NPI design phase, during the manufacture of information handling system 100, or by a service technician or a user, such as an administrator of information handling system 100.

In one embodiment, the healthiest memory module may be paired with the weakest socket. Other combinations of memory module and socket pairing may also be used as deemed necessary or desirable, which may help ensure robust performance of the information handling system. For example, healthy memory modules may be seated into sockets that are farther from the CPU while weak memory modules may be inserted into sockets that are nearer to the CPU. In another example, healthy memory modules may be inserted into weak sockets while weak memory modules may be inserted into healthy sockets. In yet another example, the weak memory modules may not be used and instead replaced with healthy memory modules.

Data from I/O health check module 135 may be utilized throughout the lifecycle of information handling system 100. For example, I/O health check module 135 may be routinely invoked, such as during any system boot phase of information handling system 100. I/O health check module 135 may also be periodically invoked, such as once a week, once a month, or another period as needed or desired, or may be otherwise invoked during the lifecycle of information handling system 100 to gather data for information handling system 100. I/O health check module 135 may also be invoked or triggered when the channel margins are below pre-determined thresholds. Accordingly, an administrator of information handling system 100 may reconfigure a current memory module and socket pairing by swapping memory modules with other sockets. If the channel margins did not improve after the swap, the administrator may re-swap or revert to the previous configuration and/or replace one or more memory modules and/or sockets.

The I/O health status data from I/O health check module 135 may be provided to management system 124 and/or BMC 122, which is similar to BMC 390 of FIG. 3. A service technician may also analyze the I/O health data and provide feedback for future designs. Over time, the feedback may also be used to determine which memory modules to swap to minimize component wear and maximize channel margins increasing system reliability over the product's lifetime. For example, memory module 110-1 may be swapped with memory module 110-2 of memory module 110-*n*.

In a particular example, subsequent to an I/O health check by I/O health check module 135, analytics module 140 may collect data on a plurality of parameters indicative of memory modules 110 seated in sockets 132. The I/O health check data collected may be stored or logged in data store 145. Analytics module 140 may calculate one or more channel margins of each one of memory modules 110 and/or sockets 132 based on the I/O health check data. Analytics module 140 may also be configured to calculate deltas between the channel margins and the expected channel margins. Based on the deltas, analytics module 140 may identify which ones of memory modules 110, sockets 132, and/or memory channels 130 are "weak" and which ones are "healthy" based on the predefined upper and lower limits.

The memory modules may be swapped with other memory modules based on the health and location of sockets 132 relative to processor 120. For example, weak memory modules may be moved closer to processor 120 while strong memory modules may be moved farther from processor 120. In addition, the weak memory modules may also be replaced. After the swap or replacement of one or more memory modules, analytics module 140 may then invoke I/O health check module 135 to perform the I/O health check again to determine whether the channel margins improved. In one example, the channel margins may have improved if the delta between the channel margins and the expected channel margins decreased. The channel margins may also be updated based on real-world scenarios after information handling system 100 has been introduced in the market. This information may be stored in data store 145 of BMC 122 and/or provided to management system 124 as an I/O health check log for further analysis. For example, management system 124 or in particular analytics module 140 may monitor whether the channel margins are getting better or worse over time.

Those of ordinary skill in the art will appreciate that the configuration, hardware, and/or software components of information handling system 100 depicted in FIG. 1 may vary. For example, the illustrative components within information handling system 100 are not intended to be exhaustive but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for the continuity of the description.

FIG. 2 shows a flowchart of a method 200 for DDR channel sensitivity and DIMM population optimization, according to an embodiment of the present disclosure. For example, method 200 may be performed by any suitable component of information handling system 100 of FIG. 1 including, but not limited to, BIOS/UEFI 125, BMC 122, and management system 124. It will be readily appreciated that not every method step set forth in this flow diagram is always necessary and that certain steps of the methods may be combined, performed simultaneously, in a different order, or perhaps omitted, without varying from the scope of the disclosure. While embodiments of the present disclosure are described in terms of information handling system 100 of FIG. 1, it should be recognized that other systems may be utilized to perform the described method. Method 200 may also be performed periodically to minimize component wear of memory modules, memory sockets, and/or memory channels. One of skill in the art will appreciate that this sequence diagram explains a typical example, which can be extended to applications or services in practice.

Method 200 typically starts at block 205 in which an information handling system is powered on. When the information handling system is powered on, a BIOS/UEFI performs a power-on self-test (POST) during a system boot process. During the POST, the BIOS/UEFI may perform several predefined procedures to ensure that the memory subsystem is configured to provide an optimal level of data transmission reliability. The method proceeds to determine and initialize installed memory according to a JEDEC standard or other relevant standards. For example, during the memory initialization, the BIOS/UEFI may issue load memory registers with values defined in settings.

The method proceeds to block 210 where the BIOS/UEFI may perform a command/address write leveling of memory modules. The method then proceeds to block 215 where TxDqs/RxDqs write/read training may be performed. Other I/O interface initializations may also be performed or desired. The method proceeds to block 220 where an I/O health check module may be invoked to monitor the setup parameters of the I/O interface of the information handling system. For example, the I/O health check module may issue one or more commands to perform an I/O health check on I/O devices, such as the memory modules, CPUs, etc. of the information handling system.

The data associated with the I/O health check may be gathered and a first set of current channel margins determined at block 225. In addition, the analytics module may calculate deltas between memory channels based on the first set of channel margins, also referred to as current channel margins and expected channel margins. There may be a set of channel margins per memory module of the information handling system. For example, if there are four memory modules then there can be four sets of channel margins, wherein each set may be compared to the expected channel margins. In this example, the four memory modules can be of the same memory type, along with other properties. Accordingly, the expected channel margins among the four memory modules may be similar if not the same.

The method proceeds to block 230, where the analytics module may determine which of the memory modules are weak or healthy if any. If the deltas between the current memory channel margins and expected memory channel margins associated with a memory module at a socket are greater than predefined upper limits, then the memory module may be considered healthy. On the other hand, if the deltas between the current memory channel margins and the expected memory channel margins associated with the memory module at a socket fall short of predefined lower limits, then that memory module may be considered weak. A weak memory module may swap sockets with a healthy memory module if needed or desired.

Afterward the swap, the method proceeds to block 235 where the analytics module may invoke the I/O health check module to perform another I/O health check of the information handling system. Data associated with the second I/O health check may be gathered and a second set of channel margins determined, wherein the second set of channel margins may now be referred to as current channel margins while the current channel margins at block 225 may now be referred to as previous channel margins. The analytics module may calculate channel margin deltas based on the current channel margins and the expected channel margins. The analytics module may also compare the current channel margins with the previous channel margins to determine if there is an improvement.

The method proceeds to decision block 240 where the analytics module may determine whether the current channel margins improved based on the previous channel margins. For example, there is an improvement if there is a reduction in the current channel margins that fall short of the predefined lower limit. In another example, there may be an improvement if there is an increase in the current channel margins that exceeds the predefined upper limits. In yet another example, there may be an improvement if the number of weak memory modules is reduced, or the number of healthy memory modules increased.

If there is an improvement, then the "YES" branch is taken, and the method proceeds to block 250 where the swapped memory modules may be retained at its current seating. If there is no improvement, then the "NO" branch is taken and the proceeds to block 245 where the swapped memory modules may be re-swapped or reverted to their previous seating. The method proceeds to block 250, where the current configuration of the memory modules may be retained. At block 255, the information handling system resumes its normal operation.

FIG. 3 illustrates an embodiment of an information handling system 300 including processors 302 and 304, a chipset 310, a memory 320, a graphics adapter 330 connected to a video display 334, a non-volatile RAM (NVRAM) 340 that includes a basic input and output system/extensible firmware interface (BIOS/EFI) module 342, a disk controller 350, a hard disk drive (HDD) 354, an optical disk drive (ODD) 356, a disk emulator 360 connected to a solid-state drive (SSD) 364, an input/output (I/O) interface 370 connected to an add-on resource 374 and a trusted platform module (TPM) 376, a network interface 380, and a BMC 390. Processor 302 is connected to chipset 310 via processor interface 306, and processor 304 is connected to the chipset via processor interface 308. In a particular embodiment, processors 302 and 304 are connected together via a high-capacity coherent fabric, such as a HyperTransport link, a QuickPath Interconnect, or the like. Chipset 310 represents an integrated circuit or group of integrated circuits that manage the data flow between processors 302 and 304 and the other elements of information handling system 300. In a particular embodiment, chipset 310 represents a pair of integrated circuits, such as a northbridge component and a southbridge component. In another embodiment, some or all of the functions and features of chipset 310 are integrated with one or more of processors 302 and 304.

Memory 320 is connected to chipset 310 via a memory interface 322. An example of memory interface 322 includes a DDR memory channel and memory 320 represents one or more DDR DIMMs. In a particular embodiment, memory interface 322 represents two or more DDR channels. In another embodiment, one or more of processors 302 and 304 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 320 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 330 is connected to chipset 310 via a graphics interface 332 and provides a video display output 336 to a video display 334. An example of a graphics interface 332 includes a PCIe interface and graphics adapter 330 can include a four-lane (x4) PCIe adapter, an eight-lane (x8) PCIe adapter, a 16-lane (x16) PCIe adapter, or another configuration, as needed or desired. In a particular embodiment, graphics adapter 330 is provided down on a PCB. Video display output 336 can include a Digital Video Interface (DVI), a High-Definition Multimedia Interface (HDMI), a DisplayPort interface, or the like, and video display 334 can include a monitor, a smart television, an embedded display such as a laptop computer display, or the like.

NVRAM 340, disk controller 350, and I/O interface 370 are connected to chipset 310 via an I/O channel 312. An example of I/O channel 312 includes one or more point-to-point PCIe links between chipset 310 and each of NVRAM 340, disk controller 350, and I/O interface 370. Chipset 310 can also include one or more other I/O interfaces, including a PCIe interface, an Industry Standard Architecture (ISA) interface, a Small Computer Serial Interface (SCSI) interface, an Inter-Integrated Circuit (I²C) interface, a System Packet Interface, a Universal Serial Bus (USB), another interface, or a combination thereof. NVRAM 340 includes BIOS/EFI module 342 that stores machine-executable code (BIOS/EFI code) that operates to detect the resources of information handling system 300, to provide drivers for the resources, to initialize the resources, and to provide common access mechanisms for the resources. The functions and features of BIOS/EFI module 342 will be further described below.

Disk controller 350 includes a disk interface 352 that connects the disc controller to a hard disk drive (HDD) 354, to ODD 356, and to disk emulator 360. An example of disk interface 352 includes an Integrated Drive Electronics (IDE) interface, an Advanced Technology Attachment (ATA) such as a parallel ATA (PATA) interface or a SATA interface, a SCSI interface, a USB interface, a proprietary interface, or a combination thereof. Disk emulator 360 permits SSD 364 to be connected to information handling system 300 via an external interface 362. An example of external interface 362 includes a USB interface, an institute of electrical and electronics engineers (IEEE) 1394 (Firewire) interface, a proprietary interface, or a combination thereof. Alternatively, SSD 364 can be disposed within information handling system 300.

I/O interface 370 includes a peripheral interface 372 that connects the I/O interface to add-on resource 374, to TPM 376, and to network interface 380. Peripheral interface 372 can be the same type of interface as I/O channel 312 or can be a different type of interface. As such, I/O interface 370 extends the capacity of I/O channel 312 when peripheral interface 372 and the I/O channel are of the same type, and the I/O interface translates information from a format suitable to the I/O channel to a format suitable to the peripheral interface 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board, or add-in card disposed within information handling system 300, a device that is external to the information handling system, or a combination thereof.

Network interface 380 represents a network communication device disposed within information handling system 300, on a main circuit board of the information handling system, integrated onto another component such as chipset 310, in another suitable location, or a combination thereof. Network interface 380 includes a network channel 382 that provides an interface to devices that are external to information handling system 300. In a particular embodiment, network channel 382 is of a different type than peripheral interface 372 and network interface 380 translates information from a format suitable to the peripheral channel to a format suitable to external devices.

In a particular embodiment, network interface 380 includes a NIC or host bus adapter (HBA), and an example of network channel 382 includes an InfiniBand channel, a Fibre Channel, a Gigabit Ethernet channel, a proprietary channel architecture, or a combination thereof. In another embodiment, network interface 380 includes a wireless communication interface, and network channel 382 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 382 can be connected to an external network resource (not illustrated). The network resource can include another information handling system, a data storage system, another network, a grid management system, another suitable resource, or a combination thereof.

BMC 390 is connected to multiple elements of information handling system 300 via one or more management interface 392 to provide out of band monitoring, maintenance, and control of the elements of the information handling system. As such, BMC 390 represents a processing device different from processor 302 and processor 304, which provides various management functions for information handling system 300. For example, BMC 390 may be responsible for power management, cooling management, and the like. The term BMC is often used in the context of server systems, while in a consumer-level device, a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 390 can vary considerably based on the type of information handling system. BMC 390 can operate in accordance with an Intelligent Platform Management Interface (IPMI). Examples of BMC 390 include an Integrated Dell® Remote Access Controller (iDRAC).

Management interface 392 represents one or more out-of-band communication interfaces between BMC 390 and the elements of information handling system 300, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 302 and 304 and procedures that are implemented on the information handling system in response to the executed code.

BMC 390 operates to monitor and maintain system firmware, such as code stored in BIOS/EFI module 342, option ROMs for graphics adapter 330, disk controller 350, add-on resource 374, network interface 380, or other elements of information handling system 300, as needed or desired. In particular, BMC 390 includes a network interface 394 that can be connected to a remote management system to receive firmware updates, as needed or desired. Here, BMC 390 receives the firmware updates, stores the updates to a data storage device associated with the BMC, and transfers the firmware updates to NVRAM 340 of the device or system that is the subject of the firmware update, thereby replacing the currently operating firmware associated with the device or system, and reboots information handling system, whereupon the device or system utilizes the updated firmware image.

BMC 390 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 390, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSA) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 390 is included on a main circuit board (such as a baseboard, a motherboard, or any combination thereof) of information handling system 300 or is integrated onto another element of the information handling system such as chipset 310, or another suitable element, as needed or desired. As such, BMC 390 can be part of an integrated circuit or a chipset within information handling system 300. An example of BMC 390 includes an iDRAC, or the like. BMC 390 may operate on a separate power plane from other resources in information handling system 300. Thus BMC 390 can communicate with the management system via network interface 394 while the resources of information handling system 300 are powered off. Here, information can be sent from the management system to BMC 390 and the information can be stored in a RAM or NVRAM associated with the BMC. Information stored in the RAM may be lost after power-down of the power plane for BMC 390, while information stored in the NVRAM may be saved through a power-down/power-up cycle of the power plane for the BMC.

Information handling system 300 can include additional components and additional buses, not shown for clarity. For example, information handling system 300 can include multiple processor cores, audio devices, and the like. While a particular arrangement of bus technologies and interconnections is illustrated for the purpose of example, one of skill will appreciate that the techniques disclosed herein are applicable to other system architectures. Information handling system 300 can include multiple CPUs and redundant bus controllers. One or more components can be integrated together. Information handling system 300 can include additional buses and bus protocols, for example, I²C and the like. Additional components of information handling system 300 can include one or more storage devices that can store machine-executable code, one or more communications ports for communicating with external devices, and various input and output (I/O) devices, such as a keyboard, a mouse, and a video display.

For purposes of this disclosure information handling system 300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 300 can include processing resources for executing machine-executable code, such as processor 302, a programmable logic array (PLA), an embedded device such as a System-on-a-Chip (SoC), or other control logic hardware. Information handling system 300 can also include one or more computer-readable media for storing machine-executable code, such as software or data.

The term "user" in this context should be understood to encompass, by way of example and without limitation, a user device, a person utilizing or otherwise associated with the device, or a combination of both. An operation described herein as being performed by a user may therefore be performed by a user device, or by a combination of both the person and the device.

As used herein, a hyphenated form of a reference numeral refers to a specific instance of an element and the un-hyphenated form of the reference numeral refers to the collective or generic element. Thus, for example, memory module "110-1" refers to an instance of a memory module class, which may be referred to collectively as memory modules "110" and any one of which may be referred to generically as a memory module "110."

Although FIG. 2 shows example blocks of method 200 in some implementations, method 200 may include additional blocks, fewer blocks, different blocks, or differently arranged blocks than those depicted in FIG. 2. Those skilled in the art will understand that the principles presented herein may be implemented in any suitably arranged processing system. Additionally, or alternatively, two or more of the blocks of method 200 may be performed in parallel. For example, blocks 225 and 230 of method 200 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device).

The present disclosure contemplates a non-transitory computer-readable medium that includes instructions or receives and executes instructions responsive to a propagated signal so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:
1. An information handling system comprising:
a first input/output (I/O) device;
a Basic Input/Output System (BIOS) configured to perform a first I/O health check of the first I/O device and to gather a first I/O health check data from the first I/O health check performed; and
a processor configured to:

calculate a first set of deltas between a first set of channel margins associated with the first I/O device based on the first I/O health check data and expected channel margins;
determine whether the first set of deltas is within the expected channel margins for the first I/O device; and
when the first set of deltas is within the expected channel margins, then identify the first I/O device as healthy;
when the first set of deltas is not within the expected channel margins, then identify the first I/O device as unhealthy; and
calculate a second set of deltas between a second set of channel margins associated with a second I/O device based on the first I/O health check data and the expected channel margins.

2. The information handling system of claim 1, wherein if there is an improvement between the first set of channel margins and the second set of channel margins, then retaining the first I/O device in a second memory socket and the second I/O device in a first memory socket.

3. The information handling system of claim 1, wherein the processor is further configured to determine whether the second set of deltas is within the expected channel margins.

4. The information handling system of claim 3, wherein when the second set of deltas is not withinin the expected channel margins, then identify the second I/O device as unhealthy.

5. The information handling system of claim 4, wherein the first I/O device and the second I/O device are Dual In-Line Memory Modules.

6. The information handling system of claim 5, wherein the first I/O device is seated in a first memory socket and the second I/O device is seated in a second memory socket.

7. The information handling system of claim 6, wherein the BIOS is further configured to subsequent to a swap between the first I/O device and the second I/O device, perform a second I/O health check of the first I/O device and gather a second I/O health check data from the second I/O health check.

8. The information handling system of claim 7, wherein the swap is performed when the first I/O device is unhealthy and the second I/O device is healthy.

9. The information handling system of claim 7, wherein the processor is further configured to calculate a third set of deltas between a third set of channel margins associated with the first I/O device based on the second I/O health check data and the expected channel margins.

10. The information handling system of claim 9, wherein the processor is further configured to determine whether there is an improvement between the first set of channel margins and the third set of channel margins.

11. The information handling system of claim 9, wherein when there is an improvement between the first set of channel margins and the third set of channel margins, then retain the first I/O device in the second memory socket and the second I/O device in the first memory socket.

12. The information handling system of claim 9, wherein when there is no improvement between the first set of channel margins and the third set of channel margins then re-swap the first I/O device and the second I/O device.

13. A method comprising:
performing, by a processor, a first input/output (I/O) health check of a first I/O device;
gathering a first I/O health check data from the first I/O health check performed;

calculating a first set of deltas between a first set of channel margins associated with the first I/O device based on the first I/O health check data and expected channel margins;

determining whether the first set of deltas are within the expected channel margins for the first I/O device;

when the first set of deltas is within the expected channel margins, then identifying the first I/O device as healthy;

when the first set of deltas is not within the expected channel margins, then identifying the first I/O device as unhealthy; and calculating a second set of deltas between a second set of channel margins associated with a second I/O device based on the first I/O health check data and the expected channel margins.

14. The method of claim 13, wherein the first I/O device and a second I/O device are Dual In-Line Memory Modules.

15. The method of claim 14, wherein the first I/O device is seated in a first memory socket and the second I/O device is seated in a second memory socket.

16. The method of claim 15, further comprising subsequent to a swap between the first I/O device and the second I/O device, performing a second I/O health check of the first I/O device and gathering a second I/O health check data from the second I/O health check.

17. The method of claim 16, further comprising determining whether there is an improvement between the first set of channel margins and the second set of channel margins.

18. The method of claim 16, wherein if there is an improvement between the first set of channel margins and the second set of channel margins, then retaining the first I/O device in the second memory socket and the second I/O device in the first memory socket.

19. The method of claim 13, further comprising determining whether the second set of deltas is within the expected channel margins.

20. A non-transitory computer-readable medium to store instructions that are executable to perform operations comprising:

performing a first input/output (I/O) health check of a first I/O device and a second I/O device;

gathering a first I/O health check data from the first I/O health check performed;

calculating deltas between a first set of channel margins associated with the first I/O device based on the first I/O health check data and expected channel margins;

calculating deltas between a second set of channel margins associated with the second I/O device based on the first I/O health check data and the expected channel margins of the first I/O device;

when the deltas between the first set of channel margins is within the expected channel margins, then identifying the first I/O device as healthy; and when the deltas between the first set of channel margins is not within the expected channel margins, then identifying the first I/O device as unhealthy.

* * * * *